United States Patent
Hiasa et al.

(10) Patent No.: US 12,136,703 B2
(45) Date of Patent: Nov. 5, 2024

(54) LITHIUM-ION SECONDARY BATTERY

(71) Applicant: MURATA MANUFACTURING CO., LTD., Kyoto (JP)

(72) Inventors: Takumi Hiasa, Kyoto (JP); Kazunari Motohashi, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 658 days.

(21) Appl. No.: 17/497,136

(22) Filed: Oct. 8, 2021

(65) Prior Publication Data
US 2022/0029201 A1  Jan. 27, 2022

Related U.S. Application Data

(63) Continuation of application No. PCT/JP2020/015608, filed on Apr. 7, 2020.

(30) Foreign Application Priority Data

Apr. 10, 2019  (JP) ................. 2019-074934

(51) Int. Cl.
| | |
|---|---|
| *H01M 10/0568* | (2010.01) |
| *H01M 4/36* | (2006.01) |
| *H01M 10/0525* | (2010.01) |
| *H01M 10/0563* | (2010.01) |
| *H01M 4/02* | (2006.01) |

(52) U.S. Cl.
CPC ....... *H01M 10/0568* (2013.01); *H01M 4/362* (2013.01); *H01M 10/0525* (2013.01); *H01M 10/0563* (2013.01); *H01M 2004/028* (2013.01)

(58) Field of Classification Search
None
See application file for complete search history.

(56) References Cited

U.S. PATENT DOCUMENTS

2015/0140448 A1* 5/2015 Takiguchi ......... H01M 10/0525
429/188

FOREIGN PATENT DOCUMENTS

| | | |
|---|---|---|
| JP | 2015111495 A | 6/2015 |
| JP | 2015195135 A | 11/2015 |
| JP | 2017103024 A | 6/2017 |

OTHER PUBLICATIONS

Chinese Office Action issued Feb. 1, 2024 in corresponding Chinese Application No. 2020080027144.X.
International Search Report for Application No. PCT/JP2020/015608, dated Jun. 16, 2020.

* cited by examiner

*Primary Examiner* — Wyatt P McConnell
(74) *Attorney, Agent, or Firm* — K&L Gates LLP

(57) ABSTRACT

A lithium-ion secondary battery includes a positive electrode, a negative electrode, and an electrolytic solution. The positive electrode includes a positive electrode active material. The electrolytic solution includes a cyclic sulfuric acid ester compound, a cyclic ether compound, and a chain alkyl dinitrile compound. A ratio of a weight (mg) of the cyclic sulfuric acid ester compound to a weight (g) of the positive electrode active material is from 0.01 to 2.

12 Claims, 4 Drawing Sheets

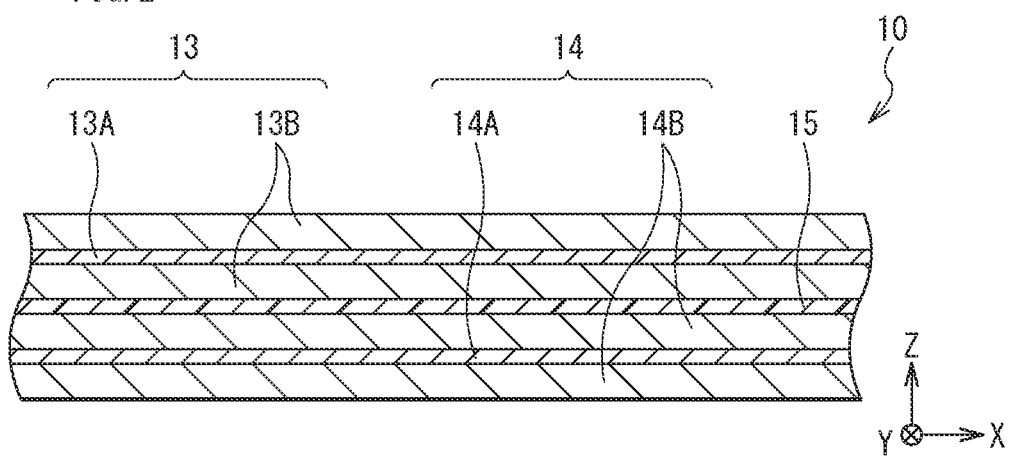
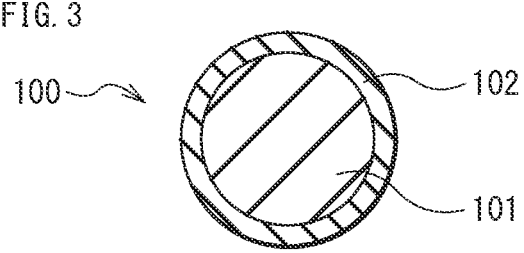

LITHIUM-ION SECONDARY BATTERY

CROSS REFERENCE TO RELATED APPLICATIONS

The present application is a continuation of PCT patent application no. PCT/JP2020/015608, filed on Apr. 7, 2020, which claims priority to Japanese patent application no. JP2019-074934 filed on Apr. 10, 2019, the entire contents of which are being incorporated herein by reference.

BACKGROUND

The present technology relates to a lithium-ion secondary battery including a positive electrode, a negative electrode, and an electrolytic solution.

Various electronic apparatuses such as mobile phones have been widely used. Accordingly, a secondary battery is under development as a power source which is smaller in size and lighter in weight and allows for a higher energy density. As such a secondary battery, a lithium-ion secondary battery is known which includes lithium as an electrode reactant. Such a lithium-ion secondary battery obtains a battery capacity using lithium insertion and extraction.

A configuration of the lithium-ion secondary battery influences battery characteristics, and has thus been given various considerations. Specifically, in order to obtain a superior cyclability characteristic, etc., the electrolytic solution includes a nitrile compound and an S=O group-containing compound, and further includes a cyclic ether.

SUMMARY

The present technology relates to a lithium-ion secondary battery including a positive electrode, a negative electrode, and an electrolytic solution.

Electronic apparatuses, on which a lithium-ion secondary battery is to be mounted, are increasingly gaining higher performance and more functions, causing more frequent use of the electronic apparatuses and expanding a use environment of the electronic apparatuses. Accordingly, there is still room for improvement in terms of battery characteristics of the lithium-ion secondary battery.

The present technology has been made in view of such an issue and it is an object of the technology to provide a lithium-ion secondary battery that makes it possible to achieve a superior battery characteristic.

According to an embodiment of the present technology, a secondary battery is provided. The secondary battery includes a positive electrode, a negative electrode, and an electrolytic solution. The positive electrode includes a positive electrode active material. The electrolytic solution includes a cyclic sulfuric acid ester compound represented by Formula (1) below, a cyclic ether compound represented by Formula (2) below, and a chain alkyl dinitrile compound represented by Formula (3) below. A ratio of a weight (mg) of the cyclic sulfuric acid ester compound to a weight (g) of the positive electrode active material is from 0.01 to 2.

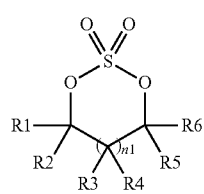
(1)

Where:
each of R1 to R6 represents one of a hydrogen group and a monovalent hydrocarbon group; and
n1 is an integer of 0 or greater.

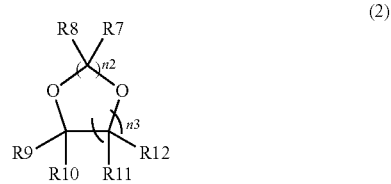
(2)

Where:
each of R7 to R12 represents one of a hydrogen group and a monovalent hydrocarbon group; and
each of n2 and n3 is an integer of 1 or greater.

(3)

Where:
each of R13 to R16 represents one of a hydrogen group and a monovalent hydrocarbon group; and
n4 is an integer of 0 or greater.

According to the lithium-ion secondary battery of an embodiment of the present technology, the electrolytic solution includes the cyclic sulfuric acid ester compound, the cyclic ether compound, and the chain alkyl dinitrile compound, and the ratio of the weight (mg) of the cyclic sulfuric acid ester compound to the weight (g) of the positive electrode active material is greater than or equal to 0.01 and less than or equal to 2. Accordingly, it is possible to achieve a superior battery characteristic.

It should be understood that effects of the technology are not necessarily limited to those described above and may include any of a series of effects described below in relation to the technology.

BRIEF DESCRIPTION OF THE FIGURES

FIG. 2 is a sectional view of a configuration of a wound electrode body illustrated in FIG. 1.

FIG. 3 is a sectional view of a configuration of a positive electrode active material particle according to an embodiment of the present technology.

DETAILED DESCRIPTION

As described herein, the present disclosure will be described based on examples with reference to the drawings, but the present disclosure is not to be considered limited to the examples, and various numerical values and materials in the examples are considered by way of example.

A description is given first of a lithium-ion secondary battery according to one embodiment of the technology.

The lithium-ion secondary battery is a secondary battery that obtains a battery capacity using lithium insertion and extraction, and includes a positive electrode, a negative electrode, and an electrolytic solution. To prevent precipitation of lithium metal on a surface of the negative electrode during charging in the lithium-ion secondary battery, an electrochemical capacity per unit area of the negative electrode is greater than an electrochemical capacity per unit area of the positive electrode, for example.

Figure 1:
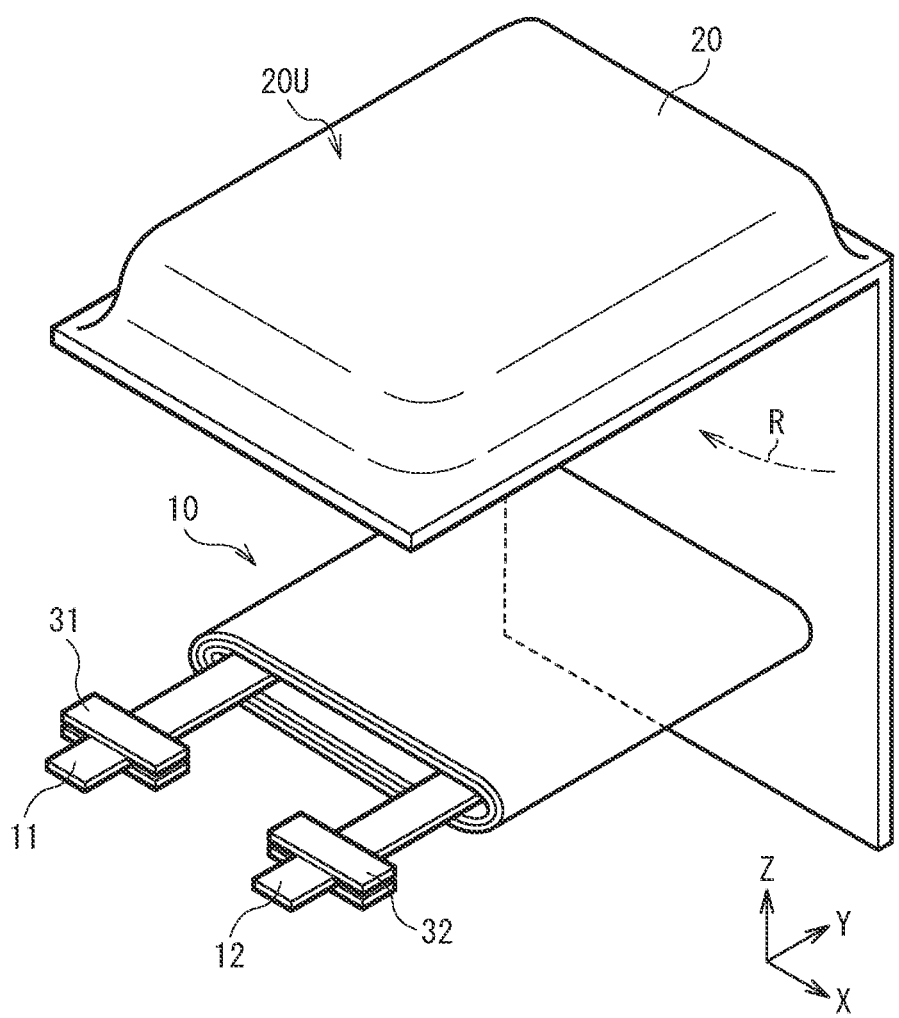
FIG. 1 is a perspective view of a configuration of a lithium-ion secondary battery according to an embodiment of the present technology.

FIG. 1 is a perspective view of a configuration of the lithium-ion secondary battery, and FIG. 2 illustrates a sectional view of a configuration of a wound electrode body 10 illustrated in FIG. 1. FIG. 3 is a sectional view of a configuration of a positive electrode active material particle 100. It should be understood that FIG. 1 illustrates a state in which the wound electrode body 10 and an outer package member 20 are separated away from each other, and FIG. 2 illustrates only a portion of the wound electrode body 10. FIG. 3 illustrates only one positive electrode active material particle 100.

Referring to FIG. 1, the lithium-ion secondary battery includes, for example: the outer package member 20; and the wound electrode body 10 contained in the outer package member 20. The outer package member 20 has flexibility or softness. The wound electrode body 10 serves as a battery device. A positive electrode lead 11 and a negative electrode lead 12 are coupled to the wound electrode body 10. That is, FIG. 1 illustrates a laminated lithium-ion secondary battery.

Referring to FIG. 1, the outer package member 20 is, for example, a single film that is foldable in a direction of an arrow R. The outer package member 20 has a depression 20U, for example. The depression 20U is adapted to receive the wound electrode body 10. The outer package member 20 may be, for example: a polymer film; a metal foil; or a laminated film in which the polymer film and the metal foil are stacked on each other. In particular, the outer package member 20 is preferably a laminated film. A reason for this is that a sufficient sealing property and sufficient durability are obtainable.

Specifically, the outer package member 20 is a laminated film including, for example, a fusion-bonding layer, a metal layer, and a surface protective layer that are stacked in this order from an inner side. Outer edges of the fusion-bonding layer are fusion-bonded to each other in the outer package member 20, for example. The fusion-bonding layer is, for example, a polypropylene film. The metal layer is, for example, an aluminum foil. The surface protective layer is, for example, a nylon film.

The outer package member 20 may include, for example, two laminated films. In this case, for example, the respective outer edges of the fusion-bonding layers may be fusion-bonded to each other, or two laminated films may be adhered to each other by means of an adhesive.

A sealing film 31, for example, is disposed between the outer package member 20 and the positive electrode lead 11. A sealing film 32, for example, is disposed between the outer package member 20 and the negative electrode lead 12. The sealing films 31 and 32 are, for example, each a polypropylene film.

As illustrated in FIGS. 1 and 2, the wound electrode body 10 includes a positive electrode 13, a negative electrode 14, a separator 15, and an electrolytic solution, for example. The electrolytic solution is a liquid electrolyte. In the wound electrode body 10, the positive electrode 13 and the negative electrode 14 are stacked on each other with the separator 15 interposed therebetween, and the stack of the positive electrode 13, the negative electrode 14, and the separator 15 is wound, for example. The positive electrode 13, the negative electrode 14, and the separator 15 are each impregnated with the electrolytic solution. A surface of the wound electrode body 10 may be protected by means of an unillustrated protective tape.

As illustrated in FIG. 2, the positive electrode 13 includes, for example, a positive electrode current collector 13A, and a positive electrode active material layer 13B provided on each of both sides of the positive electrode current collector 13A. The positive electrode active material layer 13B may be provided only on one side of the positive electrode current collector 13A.

The positive electrode current collector 13A includes, for example, an electrically conductive material such as aluminum. The positive electrode active material layer 13B includes, as a positive electrode active material or positive electrode active materials, one or more of positive electrode materials into which lithium is insertable and from which lithium is extractable. The positive electrode active material layer 13B may further include another material, examples of which include a positive electrode binder and a positive electrode conductor.

The positive electrode material includes, for example, a lithium-containing compound. The lithium-containing compound is not limited to a particular kind, and examples thereof include a lithium composite oxide and a lithium phosphoric acid compound. The lithium composite oxide is an oxide including lithium and one or more of transition metal elements, and the lithium phosphoric acid compound is a phosphoric acid compound including lithium and one or more of transition metal elements. The transition metal element is not limited to a particular kind, and examples thereof include nickel (Ni), cobalt (Co), manganese (Mn), and iron (Fe).

Specifically, examples of a layered rock-salt lithium composite oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$. Examples of a spinel lithium composite oxide include $LiMn_2O_4$. Examples of an olivine lithium phosphoric acid compound include $LiFePO_4$, $LiMnPO_4$, $LiMn_{0.5}Fe_{0.5}PO_4$, $LiMn_{0.7}Fe_{0.3}PO_4$, and $LiMn_{0.75}Fe_{0.25}PO_4$.

Here, the positive electrode active material is, for example, in a form of particles. Thus, the positive electrode active material layer 13B includes the positive electrode active material in the form of particles (positive electrode active material particles 100) as illustrated in FIG. 3, for example. The positive electrode active material particles 100 each include, for example, a center part 101 and a covering part 102.

The center part 101 includes, for example, one or more of lithium composite oxides. Details of the lithium composite oxide are as described above.

The covering part 102 covers a portion or all of a surface of the center part 101, for example. FIG. 3 illustrates, for example, a case where the covering part 102 covers all of the surface of the center part 101. A reason why the positive electrode active material particle 100 includes the covering part 102 is that the center part 101 is protected by the covering part 102. This suppresses a decomposition reaction of the electrolytic solution on the surface of the center part 101 which is reactive, while lithium is smoothly inserted into and extracted from the center part 101.

The covering part 102 includes, for example, one or more of compounds (hereinafter, referred to as "different-composition compounds") each having a composition different from a composition of the lithium composite oxide included in the center part 101. This different-composition compound may include lithium as a constituent element or may include no lithium as a constituent element.

The different-composition compound is not limited to a particular kind as long as the different-composition compound has a composition different from the composition of the lithium composite oxide included in the center part 101. Specifically, the different-composition compound is, for example, another lithium composite oxide having a composition different from the composition of the lithium composite oxide included in the center part 101. Further, examples of the different-composition compound may include a lithium phosphoric acid compound, a metallic phosphoric acid salt, a halide, and a chalcogenide. However, the chalcogenide described here is a chalcogenide other than an oxide. A reason for this is that the decomposition reaction of the electrolytic solution is sufficiently suppressed while securing charging and discharging reactions (insertion of lithium into and extraction of lithium from the center part 101).

The other lithium composite oxide may include one or more of other constituent elements that differ from constituent elements of the lithium composite oxide included in the center part 101. Examples of the other constituent elements include nickel (Ni), cobalt (Co), manganese (Mn), iron (Fe), aluminum (Al), magnesium (Mg), and zinc (Zn). Further, the other lithium composite oxide may include the constituent elements that are identical to the constituent elements of the lithium composite oxide included in the center part 101, but may have a composition ratio different from a composition ratio of the lithium composite oxide included in the center part 101. Examples of the lithium phosphoric acid compound include lithium phosphate ($Li_3PO_4$). Examples of the metallic phosphoric acid salt include a compound that includes a phosphoric acid ion and one or more of metal ions including, without limitation, lithium (Li), nickel (Ni), cobalt (Co), manganese (Mn), iron (Fe), aluminum (Al), magnesium (Mg), and zinc (Zn). Examples of the halide include lithium fluoride (LiF). Examples of the chalcogenide include lithium sulfide ($Li_2S$).

Presence or absence of the covering part 102 is determinable by analyzing the positive electrode active material particle 100 using various analytical methods.

Specifically, for example, a change in a concentration of the constituent element of the positive electrode active material particle 100 may be examined in a direction from the surface of the positive electrode active material particle 100 toward the inner side thereof. In this case, for example, the change in the concentration of the constituent element is measured by analyzing the positive electrode active material particle 100 using one or more of methods including, without limitation, Auger electron spectroscopy (AES) and secondary ion mass spectrometry (SIMS) while gradually shaving the surface of the positive electrode active material particle 100 by sputtering or the like.

Further, for example, a temporal change in an amount of a component eluted from the positive electrode active material particle 100 may be measured, by analyzing the positive electrode active material particle 100 using inductively coupled plasma (ICP) spectrometry, while gradually dissolving the surface of the positive electrode active material particle 100 in a solution such as an acidic solution.

It should be understood that a method of forming the covering part 102 is not particularly limited. Details of the method of forming the covering part 102 will be described later.

The positive electrode binder includes one or more of materials including, without limitation, a synthetic rubber and a polymer compound, for example. Examples of the synthetic rubber include a styrene-butadiene-based rubber. Examples of the polymer compound include polyvinylidene difluoride and polyimide.

The positive electrode conductor includes, for example, one or more of electrically conductive materials such as a carbon material. Examples of the carbon material include graphite, carbon black, acetylene black, and Ketjen black. The electrically conductive material may be a material such as a metal material or an electrically conductive polymer.

As illustrated in FIG. 2, the negative electrode 14 includes, for example, a negative electrode current collector 14A, and a negative electrode active material layer 14B provided on each of both sides of the negative electrode current collector 14A. The negative electrode active material layer 14B may be provided, for example, only on one side of the negative electrode current collector 14A.

The negative electrode current collector 14A includes, for example, an electrically conductive material such as copper. The negative electrode active material layer 14B includes, as a negative electrode active material or negative electrode active materials, one or more of negative electrode materials into which lithium is insertable and from which lithium is extractable. The negative electrode active material layer 14B may further include another material, example of which include a negative electrode binder and a negative electrode conductor.

The negative electrode material includes one or more of materials including, without limitation, a carbon material and a metal-based material, for example. That is, the negative electrode material may include, for example, both the carbon material and the metal-based material.

Specific examples of the carbon material include graphitizable carbon, non-graphitizable carbon, and graphite. However, the carbon material may be, for example, low crystalline carbon or amorphous carbon. Examples of a shape of the carbon material include a fibrous shape, a spherical shape, a particulate shape, and a scale-like shape. The metal-based material is a material including one or more of: metal elements that are each able to form an alloy with lithium; and metalloid elements that are each able to form an alloy with lithium. The metal-based material may be, for example, a simple substance, an alloy, a compound such as an oxide, a mixture of two or more thereof, or a material including one or more phases thereof. The metal-based material may include one or more of non-metallic elements. Specific examples of the metal element and the metalloid element include magnesium, boron, aluminum, gallium, indium, silicon, germanium, tin, lead, bismuth, cadmium, silver, zinc, hafnium, zirconium, yttrium, palladium, and platinum.

Details of the negative electrode binder are similar to those of the positive electrode binder, for example. Details of the negative electrode conductor are similar to those of the positive electrode conductor, for example.

The separator 15 is interposed between the positive electrode 13 and the negative electrode 14. The separator 15 includes a porous film including one or more of materials such as a synthetic resin or ceramic, for example. The separator 15 may be a stacked film including two or more porous films that are stacked on each other. Examples of the synthetic resin include polyethylene.

The electrolytic solution includes a solvent and an electrolyte salt. Only one solvent may be used, or two or more solvents may be used. Only one electrolyte salt may be used, or two or more electrolyte salts may be used.

The solvent includes a cyclic sulfuric acid ester compound represented by Formula (1) below, a cyclic ether compound represented by Formula (2) below, and a chain alkyl dinitrile compound represented by Formula (3) below. Only one cyclic sulfuric acid ester compound may be used, or two or more cyclic sulfuric acid ester compounds may be used. Only one cyclic ether compound may be used, or two or more cyclic ether compounds may be used. Only one chain alkyl dinitrile compound may be used, or two or more chain alkyl dinitrile compounds may be used.

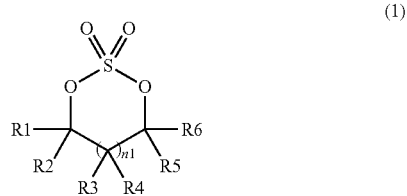

(1)

Where:
each of R1 to R6 is one of a hydrogen group and a monovalent hydrocarbon group; and n1 is an integer of 0 or greater.

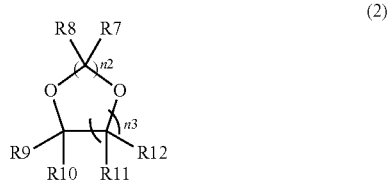

(2)

Where:
each of R7 to R12 is one of a hydrogen group and a monovalent hydrocarbon group; and each of n2 and n3 is an integer of 1 or greater.

(3)

Where:
each of R13 to R16 is one of a hydrogen group and a monovalent hydrocarbon group; and n4 is an integer of 0 or greater.

As is apparent from Formula (1), the cyclic sulfuric acid ester compound is a cyclic ester compound including a sulfuric acid group (—O—S(=O)$_2$—O—).

Each of R1 to R6 is not particularly limited as long as each of R1 to R6 is one of a hydrogen group and a monovalent hydrocarbon group, as described above. The monovalent hydrocarbon group is a monovalent group including carbon and hydrogen. The monovalent hydrocarbon group may have: a straight-chain structure; a branched structure having one or more side chains; a cyclic structure; or a structure in which two or more of those structures are bonded to each other. In addition, the monovalent hydrocarbon group may include one or more carbon-carbon unsaturated bonds or may include no carbon-carbon unsaturated bond. The carbon-carbon unsaturated bond includes a carbon-carbon double bond (>C=C<) and a carbon-carbon triple bond (—C≡C—).

Specific examples of the monovalent hydrocarbon group include an alkyl group, an alkenyl group, an alkynyl group, a cycloalkyl group, an aryl group, and a bonded group. The bonded group is a monovalent group in which two or more of an alkyl group, an alkenyl group, an alkynyl group, a cycloalkyl group, and an aryl group are bonded to each other.

The alkyl group is not limited to a particular kind, and examples thereof include a methyl group, an ethyl group, a propyl group, and a butyl group. The alkenyl group is not limited to a particular kind, and examples thereof include an ethenyl group, a propenyl group, and a butenyl group. The alkynyl group is not limited to a particular kind, and examples thereof include an ethynyl group, a propynyl group, and a butynyl group. The cycloalkyl group is not limited to a particular kind, and examples thereof include a cyclopropyl group, a cyclobutyl group, a cyclopentyl group, and a cyclohexyl group. The aryl group is not limited to a particular kind, and examples thereof include a phenyl group and a naphthyl group. The bonded group is not limited to a particular kind, and examples thereof include a benzyl group.

The alkyl group has carbon number from 1 to 4, for example, although the carbon number of the alkyl group is not particularly limited. The alkenyl group and the alkynyl group each have carbon number from 2 to 4, for example, although the carbon number of each of the alkenyl group and the alkynyl group is not particularly limited. The cycloalkyl group has carbon number from 3 to 6, for example, although the carbon number of the cycloalkyl group is not particularly limited. The aryl group has carbon number from 6 to 14, for example, although the carbon number of the aryl group is not particularly limited. A reason for this is that properties including, without limitation, solubility and compatibility of the cyclic sulfuric acid ester compound improve.

A value of n1 is not particularly limited as long as the value is an integer of 0 or greater as described above. Accordingly, the cyclic sulfuric acid ester compound may include no divalent linking group (—CR3R4—), may include only one divalent linking group, or may include two or more divalent linking groups.

It should be understood that a range of n1 is 0 or greater as described above. Accordingly, two oxygen atoms forming a ring structure are not directly bonded to each other, and are indirectly bonded to each other via two or more carbon atoms.

However, a content of the cyclic sulfuric acid ester compound in the electrolytic solution is made appropriate in a relationship with a content of the positive electrode active material in the positive electrode active material layer 13B. Specifically, a ratio (weight ratio MR1=M2/M1) of a weight M2 (mg) of the cyclic sulfuric acid ester compound to a weight M1 (g) of the positive electrode active material is from 0.01 to 2 both inclusive.

A reason why the weight ratio MR1 is within the range described above in a case where the electrolytic solution includes the three compounds, i.e., the cyclic sulfuric acid ester compound, the cyclic ether compound, and the chain alkyl dinitrile compound, is that the decomposition reaction of the electrolytic solution upon charging and discharging is markedly suppressed.

In detail, upon charging and discharging, a film derived from the cyclic sulfuric acid ester compound is formed on the surface of the positive electrode 13 (the positive electrode active material). In this case, the weight M2 of the cyclic sulfuric acid ester compound is made appropriate in the relationship with the weight M1 of the positive electrode active material, particularly in the presence of the cyclic ether compound and the chain alkyl dinitrile compound. This suppresses inhibition of lithium-ion insertion and extraction in the positive electrode active material. Thus, even if the charging and discharging reactions proceed in a case where the positive electrode active material is reactive, the electrolytic solution is markedly prevented from being decomposed easily on the surface of the positive electrode active material.

It should be understood that, in a case where the weight ratio MR1 is less than 0.01, an amount of film formed is insufficient, which makes it difficult to form the film of a necessary amount. Thus, the electrolytic solution is easily decomposed on the surface of the positive electrode active material. In contrast, in a case where the weight ratio MR1 is greater than 2, lithium-ion insertion and extraction in the positive electrode active material are suppressed.

In particular, it is preferable that the value of n1 be as small as possible. Specifically, n1 is preferably 2 or less. A reason for this is that a carbon chain forming the ring structure does not become too long, which secures properties including, without limitation, solubility and compatibility of the cyclic sulfuric acid ester compound.

In particular, the value of n1 is more preferably 0. A reason for this is that the carbon chain forming the ring structure becomes the shortest, which improves properties including, without limitation, solubility and compatibility of the cyclic sulfuric acid ester compound.

Here, the weight M2 of the cyclic sulfuric acid ester compound used for calculating the weight ratio MR1 described above is a total amount of the cyclic sulfuric acid ester compound present inside the lithium-ion secondary battery. In other words, the weight M2 includes not only a weight of the cyclic sulfuric acid ester compound included in the electrolytic solution, but also includes a weight of the cyclic sulfuric acid ester compound present in a location other than in the electrolytic solution. Examples of the cyclic sulfuric acid ester compound present in the location other than in the electrolytic solution are a cyclic sulfuric acid ester compound adhering to and permeating into the positive electrode 13, a cyclic sulfuric acid ester compound adhering to and permeating into the negative electrode 14, a cyclic sulfuric acid ester compound adhering to and permeating into the separator 15, and a cyclic sulfuric acid ester compound adhering to the outer package member 20.

A procedure of measuring the total amount (the weight M2) of the cyclic sulfuric acid ester compound present inside the lithium-ion secondary battery is as follows, for example. First, the lithium-ion secondary battery (the outer package member 20) is opened to thereby expose the wound electrode body 10 in the outer package member 20. Thereafter, a solvent in which the cyclic sulfuric acid ester compound is sufficiently dissolvable is prepared to thereby immerse the lithium-ion secondary battery in an open state in the solvent, following which the lithium-ion secondary battery is left standing in the solvent. The solvent is not particularly limited to a particular kind, and examples thereof include dimethyl carbonate. A standing time at the time when the lithium-ion secondary battery is left standing is not particularly limited, and is, for example, 24 hours. Lastly, the cyclic sulfuric acid ester compound eluted from the lithium-ion secondary battery into the solvent is quantified, thereby determining the total amount of the cyclic sulfuric acid ester compound. In this case, for example, a gas chromatography-mass spectrometry (CG-MS) apparatus is used to analyze the solvent after the lithium-ion secondary battery is left standing, following which a target component (the cyclic sulfuric acid ester compound) is quantified using a calibration curve method.

As is apparent from Formula (2), the cyclic ether compound is a cyclic compound including two ether bonds (—O—).

Each of R7 to R12 is not particularly limited as long as each of R7 to R12 is one of a hydrogen group and a monovalent hydrocarbon group, as described above. Details of the monovalent hydrocarbon group are as described above.

A value of each of n2 and n3 is not particularly limited as long as the value is an integer of 1 or greater, as described above. Accordingly, the cyclic ether compound may include only one divalent linking group (—CR7R8—), or may include two or more divalent linking groups. Further, the cyclic ether compound may include only one divalent linking group (—CR11R12—), or may include two or more divalent linking groups.

It should be understood that a range of n2 is 1 or greater as described above. Accordingly, two oxygen atoms forming a ring structure are not directly bonded to each other on side close to R7 and R8, and are indirectly bonded to each other via one or more carbon atoms. Further, a range of n3 is 1 or greater as described above. Accordingly, the above-described two oxygen atoms are not directly bonded to each other on side far from R7 and R8, and are indirectly bonded to each other via two or more carbon atoms.

A content of the cyclic ether compound in the electrolytic solution is not particularly limited. In particular, it is preferable that the content of the cyclic ether compound be made appropriate in a relationship with the content of the cyclic sulfuric acid ester compound. Specifically, a ratio (weight ratio MR2=M3/M2) of a weight M3 (mg) of the cyclic ether compound to the weight M2 (mg) of the cyclic sulfuric acid ester is preferably from 0.2 to 5 both inclusive. A reason for this is that a film derived from the cyclic sulfuric acid ester compound is smoothly and stably formed, and this further suppresses the decomposition reaction of the electrolytic solution upon charging and discharging.

In particular, it is preferable that the value of each of n2 and n3 be not too large. Specifically, each of n2 and n3 is preferably 2 or less. A reason for this is that a carbon chain forming the ring structure does not become too long, which secures properties including, without limitation, solubility and compatibility of the cyclic ether compound.

Here, the weight M3 of the cyclic ether compound used for calculating the weight ratio MR2 described above is a total amount of the cyclic ether compound present inside the lithium-ion secondary battery, as with the weight M2 of the cyclic sulfuric acid ester compound described above. A method of measuring the total amount (the weight M3) of the cyclic ether compound is similar to the method of measuring the total amount (the weight M2) of the cyclic sulfuric acid ester compound described above.

As is apparent from Formula (3), the chain alkyl dinitrile compound is a chain compound including two cyano groups (—CN). The chain alkyl dinitrile compound has one cyano group at one end of the chain structure and the other cyano group at the other end of the chain structure.

Each of R13 to R16 is not particularly limited as long as each of R13 to R16 is one of a hydrogen group and a monovalent hydrocarbon group, as described above. Details of the monovalent hydrocarbon group are as described above.

A value of n4 is not particularly limited as long as the value is an integer of 0 or greater, as described above. Accordingly, the two cyano groups are not directly bonded to each other, and are indirectly bonded to each other via one or more carbon atoms.

A content of the chain alkyl dinitrile compound in the electrolytic solution is not particularly limited. In particular, it is preferable that the content of the chain alkyl dinitrile in the electrolytic solution be from 0.1 wt % to 5 wt % both inclusive. A reason for this is that a film derived from the cyclic sulfuric acid ester compound is smoothly and stably formed, and this further suppresses the decomposition reaction of the electrolytic solution upon charging and discharging.

In particular, it is preferable that the value of n4 be not too large. Specifically, n4 is preferably 7 or less. A reason for this is that a carbon chain does not become too long, which secures properties including, without limitation, solubility and compatibility of the chain alkyl dinitrile compound.

Specific Examples of Cyclic Sulfuric Acid Ester Compound, Specific Examples of Cyclic Ether Compound, and Specific Examples of Chain Alkyl Dinitrile Compound Specific examples of the cyclic sulfuric acid ester compound include respective compounds represented by Formulae (1-1) to (1-4) below. The compounds are ethylene sulfate, methyl ethylene sulfate (2-propylene sulfate), propylene sulfate, and butylene sulfate. However, the cyclic sulfuric acid ester compound may be a compound other than the series of compounds exemplified herein.

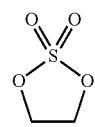

(1-1)

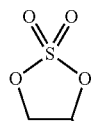

(1-2)

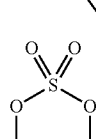

(1-3)

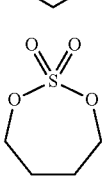

(1-4)

Specific examples of the cyclic ether compound include respective compounds represented by Formulae (2-1) to (2-3) below. The compounds are 1,3-dioxolane, 1,3-dioxane, and 1,4-dioxane. However, the cyclic ether compound may be a compound other than the series of compounds exemplified herein.

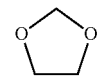

(2-1)

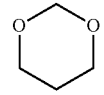

(2-2)

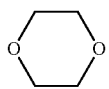

(2-3)

Specific examples of the chain alkyl dinitrile compound include respective compounds represented by Formulae (3-1) to (3-8) below. The compounds are malononitrile, succinonitrile, glutaronitrile, adiponitrile, pimelonitrile, caprylonitrile, azelaonitrile, and sebaconitrile. However, the chain alkyl dinitrile compound may be a compound other than the series of compounds exemplified herein.

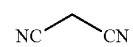

(3-1)

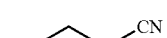

(3-2)

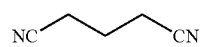

(3-3)

(3-4)

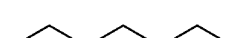

(3-5)

(3-6)

(3-7)

(3-8)

The solvent may further include one or more of other solvents such as a non-aqueous solvent (an organic solvent). The electrolytic solution including the non-aqueous solvent is a so-called non-aqueous electrolytic solution. However, the cyclic sulfuric acid ester compound, the cyclic ether compound, and the chain alkyl dinitrile compound described above are excluded from the other solvent (the non-aqueous solvent) described herein.

The non-aqueous solvent is not limited to a particular kind, and examples thereof include a cyclic carbonic acid ester, a chain carbonic acid ester, a lactone, a chain carboxylic acid ester, and a mononitrile compound. Examples of the cyclic carbonic acid ester include ethylene carbonate and propylene carbonate. Examples of the chain carbonic acid ester include dimethyl carbonate, diethyl carbonate, and methyl ethyl carbonate. Examples of the lactone include γ-butyrolactone and γ-valerolactone. Examples of the chain carboxylic acid ester include methyl acetate, ethyl acetate, methyl propionate, ethyl propionate, and propyl propionate. Examples of the mononitrile compound include acetonitrile, methoxy acetonitrile, and 3-methoxy propionitrile.

Examples of the non-aqueous solvent further include an unsaturated cyclic carbonic acid ester, a halogenated carbonic acid ester, a sulfonic acid ester, an acid anhydride, a diisocyanate compound, and a phosphoric acid ester. Examples of the unsaturated cyclic carbonic acid ester include vinylene carbonate, vinyl ethylene carbonate, and methylene ethylene carbonate. Examples of the halogenated carbonic acid ester include 4-fluoro-1,3-dioxolane-2-one, 4,5-difluoro-1,3-dioxolane-2-one, and fluoromethyl methyl carbonate. Examples of the sulfonic acid ester include 1,3-propane sultone and 1,3-propene sultone. Examples of the acid anhydride include succinic anhydride, glutaric anhydride, maleic anhydride, ethane disulfonic anhydride, propane disulfonic anhydride, sulfobenzoic anhydride, sulfopropionic anhydride, and sulfobutyric anhydride. Examples of the diisocyanate compound include hexamethylene diisocyanate. Examples of the phosphoric acid ester include trimethyl phosphate and triethyl phosphate.

The electrolyte salt includes one or more of light metal salts such as a lithium salt, for example. Specific examples of the lithium salt include lithium hexafluorophosphate, lithium tetrafluoroborate, lithium hexafluoroarsenate, lithium perchlorate, lithium trifluoromethanesulfonate, lithium bis(fluorosulfonyl)imide, lithium bis(trifluoromethanesulfonyl)imide, lithium bis(pentafluoroethanesulfonyl) imide, lithium tris(trifluoromethanesulfonyl)methyl, lithium chloride, lithium bromide, lithium fluorophosphate, lithium difluorophosphate, and lithium bis(oxalato)borate. A content of the electrolyte salt is, for example, from 0.3 mol/kg to 3.0 mol/kg both inclusive with respect to the solvent, but is not particularly limited thereto.

The positive electrode lead 11 is coupled to the positive electrode 13 (the positive electrode current collector 13A), and is led out from inside to outside the outer package member 20. The positive electrode lead 11 includes, for example, an electrically conductive material such as aluminum. The positive electrode lead 11 has a shape such as a thin plate shape or a meshed shape, for example.

The negative electrode lead 12 is coupled to the negative electrode 14 (the negative electrode current collector 14A), and is led out from inside to outside the outer package member 20. A lead-out direction of the negative electrode lead 12 is, for example, similar to a lead-out direction of the positive electrode lead 11. The negative electrode lead 12 includes, for example, an electrically conductive material such as nickel. The negative electrode lead 12 has a shape similar to the shape of the positive electrode lead 11, for example.

Upon charging the lithium-ion secondary battery, for example, lithium ions are extracted from the positive electrode 13, and the extracted lithium ions are inserted into the negative electrode 14 via the electrolytic solution. Upon discharging the lithium-ion secondary battery, for example, lithium ions are extracted from the negative electrode 14, and the extracted lithium ions are inserted into the positive electrode 13 via the electrolytic solution.

In a case of manufacturing the lithium-ion secondary battery, for example, the positive electrode 13 and the negative electrode 14 are each fabricated and the electrolytic solution is prepared, following which the lithium-ion secondary battery is assembled using the positive electrode 13, the negative electrode 14, and the electrolytic solution, as described below.

First, the positive electrode active material, the positive electrode binder, and the positive electrode conductor are mixed with each other to thereby obtain a positive electrode mixture. Thereafter, the positive electrode mixture is put into a solvent such as an organic solvent to thereby prepare a paste positive electrode mixture slurry. Lastly, the positive electrode mixture slurry is applied on both sides of the positive electrode current collector 13A to thereby form the positive electrode active material layers 13B. Thereafter, the positive electrode active material layers 13B may be compression-molded by means of a machine such as a roll pressing machine. In this case, the positive electrode active material layers 13B may be heated. The positive electrode active material layers 13B may be compression-molded a plurality of times.

In this case, the positive electrode active material particles 100 each including the center part 101 and the covering part 102 described above may be used. A procedure of fabricating the positive electrode active material particle 100 is not particularly limited. Specifically, a material to be included in the covering part 102, i.e., a covering material, may be deposited on the surface of the center part 101 utilizing, for example, mechanofusion (surface fusion), following which the center part 101 on which the covering material is deposited may be subjected to heat treatment. This mechanofusion is a technique in which mechanical energy (compressive shear stress) is applied to materials different from each other to cause a mechanochemical reaction to occur. Further, for example, a precursor (a hydroxide) of the covering part 102 may be deposited on the surface of the center part 101 utilizing a neutralization titration method, following which the center part 101 on which the hydroxide is deposited may be subjected to heat treatment.

The negative electrode active material layers 14B are formed on both sides of the negative electrode current collector 14A by a procedure similar to the fabrication procedure of the positive electrode 13 described above. Specifically, the negative electrode active material, the negative electrode binder, and the negative electrode conductor are mixed with each other to thereby obtain a negative electrode mixture. Thereafter, the negative electrode mixture is put into a solvent such as an organic solvent to thereby prepare a paste negative electrode mixture slurry. Thereafter, the negative electrode mixture slurry is applied on both sides of the negative electrode current collector 14A to thereby form the negative electrode active material layers 14B. Thereafter, the negative electrode active material layers 14B may be compression-molded.

The electrolyte salt is put into the solvent, following which the cyclic sulfuric acid ester compound, the cyclic ether compound, and the chain alkyl dinitrile compound are added to the solvent. In this case, an addition amount of the cyclic sulfuric acid ester compound is adjusted in such a manner that the weight ratio MR1 is within an appropriate range of from 0.01 to 2 both inclusive.

First, the positive electrode lead 11 is coupled to the positive electrode 13 (the positive electrode current collector 13A) by a method such as a welding method, and the negative electrode lead 12 is coupled to the negative electrode 14 (the negative electrode current collector 14A) by a method such as a welding method. Thereafter, the positive electrode 13 and the negative electrode 14 are stacked on each other with the separator 15 interposed therebetween, following which the positive electrode 13, the negative electrode 14, and the separator 15 are wound to thereby form a wound body.

Thereafter, the outer package member 20 is folded in such a manner as to sandwich the wound body, following which outer edges of two sides of the outer package member 20 are bonded to each other by a method such as a thermal fusion bonding method. Thus, the wound body is placed into the pouch-shaped outer package member 20. Lastly, the electrolytic solution is injected into the pouch-shaped outer package member 20, following which the outer package member 20 is sealed by bonding the outer edges of the remaining one side of the outer package member 20 with each other using a method such as a thermal fusion bonding method. In this case, the sealing film 31 is disposed between the outer package member 20 and the positive electrode lead 11, and the sealing film 32 is disposed between the outer package member 20 and the negative electrode lead 12. The wound body is thereby impregnated with the electrolytic solution, forming the wound electrode body 10. Thus, the wound electrode body 10 is contained in the outer package member 20. As a result, the lithium-ion secondary battery is completed.

According to the lithium-ion secondary battery of the embodiment, the electrolytic solution includes the cyclic sulfuric acid ester compound, the cyclic ether compound, and the chain alkyl dinitrile compound, and the weight ratio MR1 is from 0.01 to 2 both inclusive. In this case, the film derived from the cyclic sulfuric acid ester compound is formed on the surface of the positive electrode 13, and the inhibition of lithium-ion insertion and extraction in the positive electrode active material is suppressed, as described above. As a result, the decomposition reaction of the electrolytic solution is markedly suppressed upon charging and discharging. Accordingly, it is possible to achieve superior battery characteristics.

In particular, the weight ratio MR2 may be from 0.2 to 5 both inclusive. This allows the film to be formed more smoothly and stably. Accordingly, the decomposition reaction of the electrolytic solution upon charging and discharging is further suppressed, which makes it possible to achieve higher effects.

Further, the content of the chain alkyl dinitrile compound in the electrolytic solution may be from 0.1 wt % to 5 wt % both inclusive. This allows the film to be formed more smoothly and stably. Accordingly, the decomposition reaction of the electrolytic solution upon charging and discharging is further suppressed, which makes it possible to achieve higher effects.

Further, n1 in Formula (1) may be 2 or less, each of n2 and n3 in Formula (2) may be 2 or less, and n4 in Formula (3) may be 7 or less. This secures properties including, without limitation, solubility and compatibility of each of the cyclic sulfuric acid ester compound, the cyclic ether compound, and the chain alkyl dinitrile compound, which makes it possible to achieve higher effects.

Further, the positive electrode active material (the positive electrode active material particle 100) may include the center part 101 (the lithium composite oxide) and the covering part 102 (the different-composition compound). This suppresses the decomposition reaction of the electrolytic solution on the surface of the reactive center part 101 while the lithium ions are smoothly inserted into and extracted from the center part 101. As a result, the decomposition reaction of the electrolytic solution is further suppressed while securing the charging and discharging reactions, which makes it possible to achieve higher effects.

In this case, the different-composition compound may include a material such as another lithium composite oxide. This sufficiently suppresses the decomposition reaction of the electrolytic solution while securing the charging and discharging reactions, which makes it possible to achieve further higher effects.

The configurations of the lithium-ion secondary batteries described above are appropriately modifiable as described below. It should be understood that any two or more of the following series of modifications may be combined.

Figure 4:
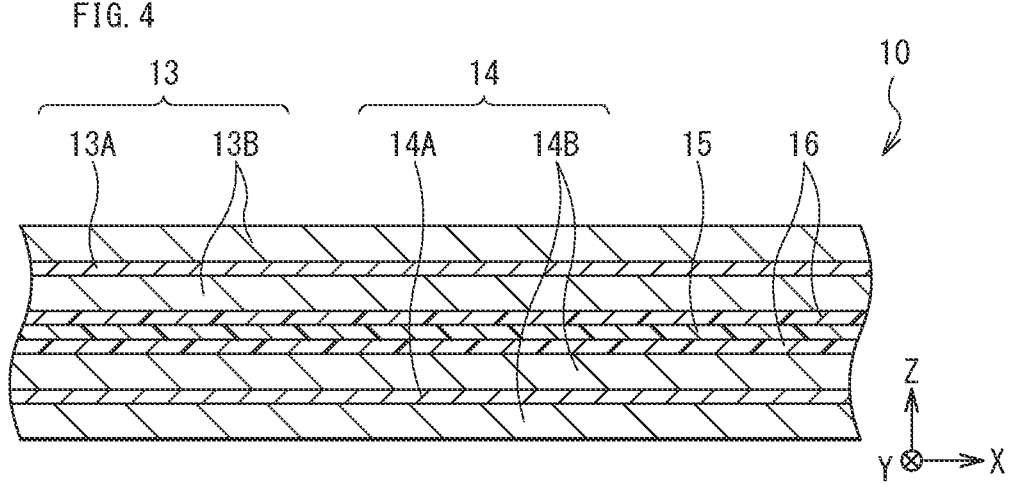
FIG. 4 is a sectional view of a configuration of a lithium-ion secondary battery (wound electrode body) according to an embodiment of the present technology.

FIG. 4 illustrates a sectional configuration of a lithium-ion secondary battery (the wound electrode body 10) of Modification 1, and corresponds to FIG. 2. The electrolytic solution which is a liquid electrolyte is included in FIG. 2; however, as illustrated in FIG. 4, an electrolyte layer 16 which is a gel electrolyte may be included instead of the electrolytic solution, for example.

In the wound electrode body 10 including the electrolyte layer 16, the positive electrode 13 and the negative electrode 14 are stacked with the separator 15 and the electrolyte layer 16 interposed therebetween, and the stack of the positive electrode 13, the negative electrode 14, the separator 15, and the electrolyte layer 16 is wound, for example. The electrolyte layer 16 is interposed, for example, between the positive electrode 13 and the separator 15, and between the negative electrode 14 and the separator 15.

Specifically, the electrolyte layer 16 includes a polymer compound together with the electrolytic solution. The electrolytic solution is held by the polymer compound in the electrolyte layer 16. A configuration of the electrolytic solution is as described above. The polymer compound includes, for example, a homopolymer such as polyvinylidene difluoride, a copolymer such as a copolymer of vinylidene fluoride and hexafluoropyrene, or both. In a case of forming the electrolyte layer 16, for example, a precursor solution that includes materials including, without limitation, the electrolytic solution, the polymer compound, and an organic solvent is prepared, following which the precursor solution is applied on each of the positive electrode 13 and the negative electrode 14.

Similar effects are also obtainable in this case, as lithium ions are movable between the positive electrode 13 and the negative electrode 14 via the electrolyte layer 16.

Figure 5:
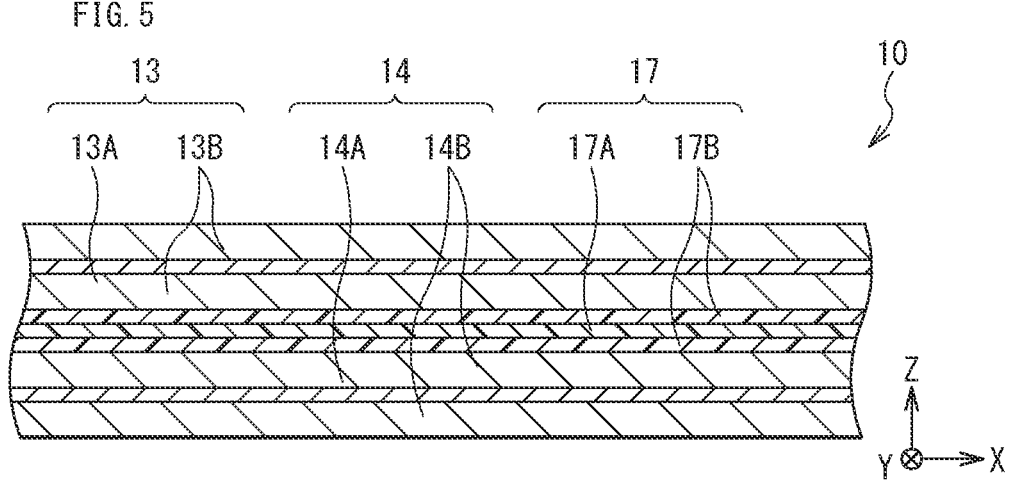
FIG. 5 is a sectional view of a configuration of a lithium-ion secondary battery (wound electrode body) according to an embodiment of the present technology.

FIG. 5 illustrates a sectional configuration of a lithium-ion secondary battery (the wound electrode body 10) of Modification 2, and corresponds to FIG. 2. The separator 15 which is a porous film is included in FIG. 2; however, as illustrated in FIG. 4, a separator 17 may be included instead of the separator 15, for example.

Specifically, the separator 17 includes, for example, a base layer 17A and a polymer compound layer 17B provided on each of both sides of the base layer 17A. However, the polymer compound layer 17B may be provided on only one side of the base layer 17A.

The base layer 17A may have, for example, a similar configuration as that of the separator 15 described above. That is, the base layer 17A includes, for example, a porous film. The polymer compound layer 17B includes, for example, a polymer compound such as polyvinylidene difluoride, because such a polymer compound has superior physical strength and is electrochemically stable.

It should be understood that the polymer compound layer 17B may include inorganic particles, for example. A reason for this is that heat is released by the inorganic particles when the lithium-ion secondary battery generates heat, which improves safety of the lithium-ion secondary battery. The inorganic particles are not limited to a particular kind, and examples thereof include insulating particles of a material such as aluminum oxide or aluminum nitride.

In a case of fabricating the separator 17, for example, a precursor solution that includes materials including, without limitation, the polymer compound and an organic solvent is prepared, following which the precursor solution is applied on each of both sides of the base layer 17A, to thereby form the polymer compound layers 17B.

Similar effects are also obtainable in this case, as the positive electrode 13 and the negative electrode 14 are separated away from each other with the separator 17 interposed therebetween.

The applications of the lithium-ion secondary battery are not particularly limited as long as they are, for example, machines, apparatuses, instruments, devices, or systems (assembly of a plurality of apparatuses, for example) in which the lithium-ion secondary battery is usable as a driving power source, an electric power storage source for electric power accumulation, or any other source. The lithium-ion secondary battery used as a power source may serve as a main power source or an auxiliary power source. The main power source is preferentially used regardless of the presence of any other power source. The auxiliary power source may be used in place of the main power source, or may be switched from the main power source on an as-needed basis. In a case where the lithium-ion secondary battery is used as the auxiliary power source, the kind of the main power source is not limited to the lithium-ion secondary battery.

Specific examples of the applications of the lithium-ion secondary battery include: electronic apparatuses including portable electronic apparatuses; portable life appliances; storage devices; electric power tools; battery packs mountable on laptop personal computers or other apparatuses as a detachable power source; medical electronic apparatuses; electric vehicles; and electric power storage systems. Examples of the electronic apparatuses include video cameras, digital still cameras, mobile phones, laptop personal computers, cordless phones, headphone stereos, portable radios, portable televisions, and portable information terminals. Examples of the portable life appliances include electric shavers. Examples of the storage devices include backup power sources and memory cards. Examples of the electric power tools include electric drills and electric saws. Examples of the medical electronic apparatuses include pacemakers and hearing aids. Examples of the electric vehicles include electric automobiles including hybrid automobiles. Examples of the electric power storage systems include home battery systems for accumulation of electric power for emergency. Needless to say, the lithium-ion secondary battery may have applications other than the series of applications exemplified herein.

EXAMPLES

A description is given of Examples of the technology below.

Experiment Examples 1 to 23

Test coin-type lithium-ion secondary batteries illustrated in FIG. 6 were fabricated, following which a battery characteristic of the lithium-ion secondary batteries was evaluated as described below.

Figure 6:
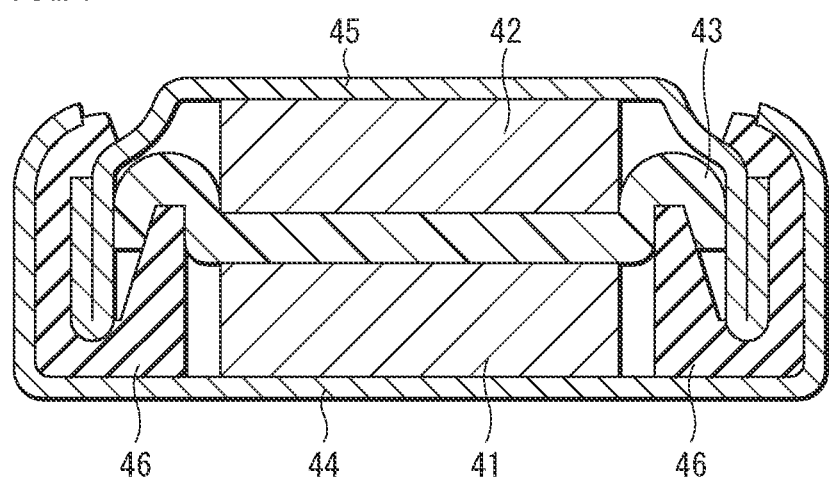
FIG. 6 is a sectional view of a configuration of a test coin-type lithium-ion secondary battery according to an embodiment of the present technology.

The coin-type lithium-ion secondary battery includes, as illustrated in FIG. 6, a positive electrode 41 contained in an outer package can 44, a negative electrode 42 contained in an outer package cup 45, a separator 43, a gasket 46, and an electrolytic solution. The positive electrode 41 and the negative electrode 42 are stacked on each other with the separator 43 interposed therebetween. The outer package can 44 and the outer package cup 45 are crimped to each other by means of the gasket 46. The positive electrode 41, the negative electrode 42, and the separator 43 are each impregnated with the electrolytic solution.

In a case of fabricating the positive electrode active material particles 100, first, the center part 101 (lithium cobalt oxide ($LiCoO_2$) serving as a lithium composite oxide) in a powdered state having an average particle size measured by a laser-scattering method of 13 μm was prepared. Thereafter, three kinds of covering materials, i.e., lithium carbonate ($Li_2Co_3$), manganese carbonate ($MnCO_3$), and ammonium dihydrogen phosphate (($NH_4$)$H_2PO_4$), were mixed. In this case, a mixture ratio (a molar ratio) between lithium (Li), manganese (Mn), and phosphorus (P) was set to 3:3:2.

Thereafter, the center part 101 and the covering material were mixed, following which the mixture was subjected to mechanochemical treatment (whose treatment time was 1 hour) using a mechanochemical apparatus. In this case, a mixture ratio (the weight ratio) between the center part 101 and the covering material was set to 100:2. Thus, lithium carbonate, manganese carbonate, and ammonium dihydrogen phosphate were deposited on the surface of the center part 101, to thereby obtain a firing precursor.

Lastly, the firing precursor was fired at a firing rate of 3° C./min and a firing temperature of 900° C., following which the firing precursor was held in that state of firing for 3 hours, and was thereafter gradually cooled. Thus, the covering part 102 including a reactant of lithium carbonate, manganese carbonate, and ammonium dihydrogen phosphate was formed in such a manner as to cover the entire surface of the center part 101.

The positive electrode active material particle 100 was analyzed using a scanning electron-microscope/energy-dispersive X-ray spectrometer (SEM/EDX) and a time-of-flight secondary ion mass spectrometer (TOF-SIMS). As a result, it was confirmed that phosphorus atoms were locally distributed (scattered) on the surface of the center part 101, and manganese atoms were entirely distributed on the surface of the center part 101.

Further, the positive electrode active material particle 100 was analyzed using powder X-ray diffractometry whose light source was CuKα radiation of a long wavelength. As a result, a diffraction peak attributed to lithium phosphate ($Li_3PO_4$(LPO)) was confirmed, in addition to a diffraction peak attributed to lithium cobalt oxide ($LiCoO_2$(LCO)), which is a layered rock-salt lithium composite oxide. In other words, in the positive electrode active material particle 100, the covering part 102 including lithium phosphate was formed on the surface of the center part 101 including lithium cobalt oxide.

In a case of fabricating the positive electrode 41, first, 91 parts by mass of the positive electrode active material (the positive electrode active material particles 100 described above), 3 parts by mass of the positive electrode binder (polyvinylidene difluoride), and 6 parts by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby obtain a paste positive electrode mixture slurry. Thereafter, the positive electrode mixture slurry was applied on both sides of the positive electrode current collector (a band-shaped aluminum foil having a thickness of 12 μm) by means of a coating apparatus, following which the applied positive electrode mixture slurry was dried to thereby form the positive electrode active material layers. Lastly, the positive electrode active material layers were compression-molded by means of a roll pressing machine.

For comparison, a positive electrode 41 was fabricated in accordance with a similar procedure except that the center part 101 on which the covering part 102 was not formed was used as it is as the positive electrode active material.

In a case of fabricating the negative electrode 42, first, 90 parts by mass of the negative electrode active material (graphite) and 10 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby obtain a paste negative electrode mixture slurry. Thereafter, the negative electrode mixture slurry was applied on both sides of the negative electrode current collector (a band-shaped copper foil having a thickness of 15 μm) by means of a coating apparatus, following which the applied negative electrode mixture slurry was dried to thereby form the negative electrode active material layers. Lastly, the negative electrode active material layers were compression-molded by means of a roll pressing machine.

In a case of preparing the electrolytic solution, first, the solvent (ethylene carbonate and propylene carbonate) was prepared. In this case, a mixture ratio (a volume ratio) between ethylene carbonate and propylene carbonate in the solvent was set to 50:50. Thereafter, the electrolyte salt was added to the solvent, following which the solvent was stirred. Here, as described in Tables 1 and 2, lithium hexafluorophosphate (LiPF$_6$) and lithium bis(fluorosulfonyl)imide (LiFSI) were used as the electrolyte salt, and a content of the electrolyte salt was set to 1 mol/kg with respect to the solvent. Lastly, the cyclic sulfuric acid ester compound, the cyclic ether compound, and the chain alkyl dinitrile compound were added to the solvent, following which the solvent was stirred. The respective kinds and addition amounts (the weight ratios MR1 and MR2 and the content (wt %)) of the cyclic sulfuric acid ester compound, the cyclic ether compound, and the chain alkyl dinitrile compound were as described in Tables 1 and 2.

Here, used as the cyclic sulfuric acid ester compounds were ethylene sulfate (ESF), methyl ethylene sulfate (MESF), propylene sulfate (PSF), and butylene sulfate (BSF). Used as the cyclic ether compounds were 1,3-dioxane (DOX1) and 1,4-dioxane (DOX2). Used as the chain alkyl dinitrile compounds were malononitrile (MLN), succinonitrile (SN), adiponitrile (ADN), and sebaconitrile (SBN).

For comparison, electrolytic solutions were prepared in accordance with a similar procedure except that the cyclic ether compound was not used. Further, for comparison, electrolytic solutions were prepared in accordance with a similar procedure except that a sulfonic acid ester (1,3-propanesultone (PS)) was used instead of the cyclic sulfuric acid ester compound, and an unsaturated cyclic carbonic acid ester (vinylene carbonate (VC)) and another lithium salt (lithium difluoro(oxalato)borate (LiDFOB)) represented by Formula (4) below were used instead of the cyclic ether compound.

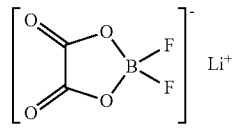

In a case of assembling the lithium-ion secondary battery, first, the positive electrode 41 was contained in the outer package can 44, and the negative electrode 42 was contained in the outer package cup 45. Thereafter, the outer package can 44 containing the positive electrode 41 and the outer package cup 45 containing the negative electrode 42 were stacked on each other with the separator 43 and the gasket 46 interposed therebetween. The separator 43 was a fine-porous polyethylene film having a thickness of 25 μm and was impregnated with the electrolytic solution. Lastly, the outer package can 44 and the outer package cup 45 were crimped to each other by means of the gasket 46. Thus, the positive electrode 41, the negative electrode 42, and the separator 43 were sealed in the outer package can 44 and the outer package cup 45. As a result, the coin-type lithium-ion secondary battery was completed.

Evaluation of a cyclability characteristic as a battery characteristic of the secondary batteries revealed the results described in Tables 1 and 2.

In a case of examining the cyclability characteristic, first, the secondary battery was charged and discharged for one cycle in an ambient-temperature environment (at a temperature of 23° C.) in order to stabilize a state of the secondary battery. Thereafter, the secondary battery was charged and discharged for another cycle in the same environment to thereby measure a second-cycle discharge capacity. Thereafter, the secondary battery was charged and discharged for another 100 cycles in the same environment to thereby measure a 102nd-cycle discharge capacity. Lastly, the following was calculated: capacity retention rate (%)=(102nd-cycle discharge capacity/second-cycle discharge capacity)×100.

Upon first-cycle charging, the secondary battery was charged with a constant current of 0.1 C until a voltage reached 4.45 V, following which the secondary battery was charged with a constant voltage of 4.45 V until the current reached 0.05 C. Upon first-cycle discharging, the secondary battery was discharged with a constant current of 0.1 C until a voltage reached 3.0 V. It should be understood that 0.1 C is a value of a current that causes a battery capacity (a theoretical capacity) to be completely discharged in 10, and 0.05 C is a value of a current that causes a battery capacity to be completely discharged in 20 hours.

A second-cycle charging condition was similar to the first-cycle charging condition except that the current was changed from 0.1 C to 1 C, and a second-cycle discharging condition was similar to the first-cycle discharging condition except that the current was changed from 0.1 C to 1 C. It should be understood that 1 C is a value of a current that causes a battery capacity to be completely discharged in 1 hour.

TABLE 1

| Experiment example | Positive electrode Center part | Positive electrode Covering part | Electrolyte salt Kind | Cyclic sulfuric acid ester compound Kind | Cyclic sulfuric acid ester compound Weight ratio MR1 | Cyclic ether compound Kind | Cyclic ether compound Weight ratio MR2 | Chain alkyl dinitrile compound Kind | Chain alkyl dinitrile compound Content (wt %) | Capacity retention rate (%) |
|---|---|---|---|---|---|---|---|---|---|---|
| 1 | LCO | LPO | LiPF$_6$ | ESF | 0.01 | DOX1 | 1 | SN | 1 | 77 |
| 2 | | | | | 0.2 | | | | | 92 |
| 3 | | | | | 1 | | | | | 89 |
| 4 | | | | | 2 | | | | | 82 |
| 5 | | | | | 10 | | | | | 74 |
| 6 | | | | MESF | 0.2 | DOX1 | 1 | SN | 1 | 90 |
| 7 | | | | PSF | 0.2 | DOX1 | 1 | ADN | 1 | 89 |
| 8 | | | | BSF | 0.2 | DOX1 | 1 | ADN | 1 | 80 |
| 9 | | | | ESF | 0.2 | DOX1 | 0.5 | SN | 1 | 90 |
| 10 | | | | ESF | 1 | DOX1 | 0.2 | | | 87 |
| 11 | | | | | | | 5 | | | 89 |
| 12 | | | | | | DOX2 | 1 | | | 81 |
| 13 | | | | ESF | 0.2 | DOX1 | 1 | SN | 0.1 | 92 |
| 14 | | | | | | | | | 5 | 79 |

TABLE 2

| Experiment example | Positive electrode Center part | Positive electrode Covering part | Electrolyte salt Kind | Cyclic sulfuric acid ester compound Kind | Cyclic sulfuric acid ester compound Weight ratio MR1 | Cyclic ether compound Kind | Cyclic ether compound Weight ratio MR2 | Chain alkyl dinitrile compound Kind | Chain alkyl dinitrile compound Content (wt %) | Capacity retention rate (%) |
|---|---|---|---|---|---|---|---|---|---|---|
| 15 | LCO | LPO | LiPF$_6$ | ESF | 0.2 | DOX1 | 1 | MLN | 1 | 89 |
| 16 | | | | | | | | ADN | 1 | 92 |
| 17 | | | | | | | | SBN | 1 | 93 |
| 18 | LCO | LPO | LiFSI | ESF | 0.2 | DOX1 | 1 | SN | 1 | 75 |
| 19 | LCO | — | LiPF$_6$ | ESF | 0.2 | DOX1 | 1 | SN | 1 | 77 |
| 20 | LCO | LPO | LiPF$_6$ | ESF | 0.2 | — | — | SN | 1 | 74 |
| 21 | | | | PS | 0.2 | DOX1 | 1 | | | 73 |
| 22 | | | | ESF | 0.2 | VC | 1 | | | 70 |
| 23 | | | | | | LiDFOB | 1 | | | 70 |

As described in Tables 1 and 2, the capacity retention rate varied depending on, for example, the composition of the electrolytic solution.

Specifically, in a case where the electrolytic solution included the cyclic sulfuric acid ester compound and the chain alkyl dinitrile compound, but did not include the cyclic ether compound (Experiment example 20), a sufficient capacity retention rate was not obtained.

In contrast, in a case where the electrolytic solution included the cyclic sulfuric acid ester compound and the chain alkyl dinitrile compound, and also included the cyclic ether compound (Experiment examples 1 to 19), the capacity retention rate varied greatly depending on the weight ratio MR1. That is, in a case where the weight ratio MR1 was from 0.01 to 2 both inclusive (Experiment examples 1 to 4 and 6 to 19), a sufficient capacity retention rate was obtained, unlike a case where the weight ratio MR1 was greater than 2 (Experiment example 5).

In particular, in a case where the electrolytic solution included the cyclic ether compound together with the cyclic sulfuric acid ester compound and the chain alkyl dinitrile compound, and where the appropriate condition described above regarding the weight ratio MR1 (MR1 being in the range from 0.01 to 2 both inclusive) was satisfied, a tendency to be explained below was obtained.

First, a sufficient capacity retention rate was obtained in a case where the weight ratio MR2 was from 0.2 to 5 both inclusive. Second, a sufficient capacity retention rate was obtained in a case where the content of the chain alkyl dinitrile compound was from 0.1 wt % to 5 wt % both inclusive. Third, a higher capacity retention rate was obtained in a case where the covering part 102 was formed as compared with a case where the covering part 102 was not formed.

It should be understood that, in a case where the sulfonic acid ester was used instead of the cyclic sulfuric acid ester compound, a sufficient capacity retention rate was not obtained unlike the case where the cyclic sulfuric acid ester compound was used. In the former case, in particular, the capacity retention rate was low as compared with the case where the cyclic ether compound was not used in the first place.

In addition, in a case where the unsaturated cyclic carbonic acid ester or the other lithium salt was used instead of the cyclic ether compound, a sufficient capacity retention rate was not obtained unlike the case where the cyclic ether compound was used. In the former case, in particular, the capacity retention rate was low as compared with the case where the cyclic ether compound was not used in the first place.

Based upon the results described in Tables 1 and 2, in the case where the electrolytic solution included the cyclic sulfuric acid ester compound, the cyclic ether compound, and the chain alkyl dinitrile compound, and where the weight ratio MR1 was from 0.01 to 2 both inclusive, the cyclability characteristic was improved. Accordingly, a superior battery characteristic of the lithium-ion secondary battery was obtained.

Although the technology has been described above with reference to the embodiments and Examples, embodiments of the technology are not limited to those described with reference to the embodiments and Examples above and are modifiable in a variety of ways.

Specifically, although the description has been given of the case where the lithium-ion secondary battery according to the technology is the laminated secondary battery, the type of the lithium-ion secondary battery according to the technology is not particularly limited. Specifically, the lithium-ion secondary battery according to the technology may be a secondary battery of any other type such as a cylindrical type, a prismatic type, or a coin type. Moreover, although the description has been given of a case of the battery device having a wound structure to be used in the lithium-ion secondary battery according to the technology, the structure of the battery device is not particularly limited. Specifically, the battery device may have any other structure such as a stacked structure.

It should be understood that the effects described herein are mere examples, and effects of the technology are therefore not limited to those described herein. Accordingly, the technology may achieve any other effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A lithium-ion secondary battery comprising:
a positive electrode that includes a positive electrode active material;
a negative electrode; and
an electrolytic solution that includes a cyclic sulfuric acid ester compound represented by Formula (1), a cyclic ether compound represented by Formula (2), and a chain alkyl dinitrile compound represented by Formula (3),
wherein a ratio of a weight in milligrams of the cyclic sulfuric acid ester compound to a weight in grams of the positive electrode active material is from 0.01 to 2,

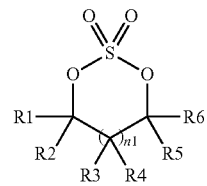

wherein
each of R1 to R6 represents one of a hydrogen group and a monovalent hydrocarbon group, and
n1 is an integer of 0 or greater,

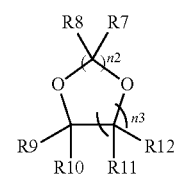

wherein
each of R7 to R12 represents one of a hydrogen group and a monovalent hydrocarbon group, and
each of n2 and n3 is an integer of 1 or greater, and

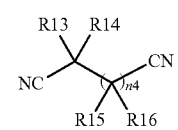

wherein
each of R13 to R16 represents one of a hydrogen group and a monovalent hydrocarbon group, and
n4 is an integer of 0 or greater.

2. The lithium-ion secondary battery according to claim 1, wherein a ratio of a weight in milligrams of the cyclic ether compound to the weight in milligrams of the cyclic sulfuric acid ester compound is from 0.2 to 5.

3. The lithium-ion secondary battery according to claim 1, wherein a content of the chain alkyl dinitrile compound in the electrolytic solution is from 0.1 weight percent to 5 weight percent.

4. The lithium-ion secondary battery according to claim 2, wherein a content of the chain alkyl dinitrile compound in the electrolytic solution is from 0.1 weight percent to 5 weight percent.

5. The lithium-ion secondary battery according to claim 1, wherein
n1 in Formula (1) is 2 or less,
each of n2 and n3 in Formula (2) is 2 or less, and
n4 in Formula (3) is 7 or less.

6. The lithium-ion secondary battery according to claim 2, wherein
n1 in Formula (1) is 2 or less,
each of n2 and n3 in Formula (2) is 2 or less, and
n4 in Formula (3) is 7 or less.

7. The lithium-ion secondary battery according to claim 3, wherein n1 in Formula (1) is 2 or less, each of n2 and n3 in Formula (2) is 2 or less, and n4 in Formula (3) is 7 or less.

8. The lithium-ion secondary battery according to claim 1, wherein the positive electrode active material includes a center part that includes a lithium composite oxide, and a covering part that covers at least a portion of a surface of the center part and that includes a compound having a composition different from the lithium composite oxide.

9. The lithium-ion secondary battery according to claim 2, wherein the positive electrode active material includes a center part that includes a lithium composite oxide, and a covering part that covers at least a portion of a surface of the center part and that includes a compound having a composition different from the lithium composite oxide.

10. The lithium-ion secondary battery according to claim 3, wherein the positive electrode active material includes a center part that includes a lithium composite oxide, and a covering part that covers at least a portion of a surface of the center part and that includes a compound having a composition different from the lithium composite oxide.

11. The lithium-ion secondary battery according to claim 5, wherein the positive electrode active material includes a center part that includes a lithium composite oxide, and a covering part that covers at least a portion of a surface of the center part and that includes a compound having a composition different from the lithium composite oxide.

12. The lithium-ion secondary battery according to claim 8, wherein the compound having the composition different from the lithium composite oxide includes at least one of (1) another lithium composite oxide having a composition that is different from the lithium composite oxide; a lithium phosphoric acid compound; a metallic phosphoric acid salt; a halide; or a chalcogenide other than an oxide.

\* \* \* \* \*